United States Patent [19]

Meunier

[11] Patent Number: 4,992,219

[45] Date of Patent: Feb. 12, 1991

[54] CHARCOAL BED ASSEMBLY

[75] Inventor: Pierre P. Meunier, Nepean, Canada

[73] Assignee: Her Majesty the Queen in right of Canada, as represented by the Minister of National Defence, Canada

[21] Appl. No.: 343,510

[22] Filed: Apr. 27, 1989

[30] Foreign Application Priority Data

Sep. 20. 1988 [CA] Canada .................................. 577968

[51] Int. Cl.[5] ........................ B29C 65/08; B29C 65/56

[52] U.S. Cl. ........................................ 264/23; 53/436; 53/486; 53/526; 55/DIG. 5; 156/69; 156/73.1; 156/580.2; 210/502.1; 264/249

[58] Field of Search ..................... 156/69, 73.1, 580.1, 156/580.2; 264/23, 249; 53/436, 486, 489, 526, 366; 215/231; 220/362, 363, DIG. 31; 210/502.1, 510.1; 55/DIG. 5, 502, 316

[56] References Cited

U.S. PATENT DOCUMENTS

| | | | |
|---|---|---|---|
| 3,483,066 | 12/1969 | Harris et al. | 156/73.1 |
| 3,688,464 | 9/1972 | Fox | 53/436 |
| 3,850,776 | 11/1974 | Karobath et al. | 156/580.1 |
| 3,972,758 | 8/1976 | Bleber | 156/69 |
| 4,399,491 | 8/1983 | Kackenmeister | 156/73.1 |
| 4,411,122 | 10/1983 | Cornish et al. | 53/526 |
| 4,422,861 | 12/1983 | Dusza | 55/502 |
| 4,714,486 | 12/1987 | Silverthorn | 55/316 |

FOREIGN PATENT DOCUMENTS

| | | |
|---|---|---|
| 173962 | 2/1953 | Fed. Rep. of Germany . |
| 2816663 | 10/1979 | Fed. Rep. of Germany . |

*Primary Examiner*—Michael Wityshyn

*Attorney, Agent, or Firm*—Stevens, Davis, Miller & Mosher

[57] ABSTRACT

A method and an apparatus are provided for securing a bed of charcoal under pressure in a plastic material housing in the manufacture of charcoal filter canisters for gas masks. The bed of particulate charcoal is placed in the housing and covered with a retainer. A compactor is placed on the retainer and loaded to produce the desired compaction of the charcoal. An ultrasonic welder is then used to secure the retainer in place for one embodiment, a spring-loaded compactor is placed on top of the retainer and an ultrasonic nodal horn is placed over the compactor. The horn presses the compactor against the retainer with the necessary compressing force to compress the charcoal bed, while at the same time producing an ultrasonic weld around the periphery of the housing, welding the retainer in place. The compactor seats on a nodal point of the horn, so that ultrasonic vibrations are not transmitted from the horn through the compactor to the charcoal bed.

4 Claims, 3 Drawing Sheets

CHARCOAL BED ASSEMBLY

The present invention relates to the manufacture of charcoal filter canisters and more particularly to the manufacture of such canisters with synthetic plastic material housings.

In the manufacture of charcoal filter canisters such as those used in gas masks, it is necessary to secure the granular charcoal under a compacting force that is typically somewhat over 40 lbs. per square inch or, with a 12 square inch bed, about 500 lbs. dead load. With the use of plastic material as the canister housing, the retention of the charcoal is difficult to achieve.

The various methods now used for securing a charcoal bed in a plastic material housing have proven either unsatisfactory or too costly. Technical problems arise because the quantity of charcoal can vary from one canister to the next and because the edge conditions of the charcoal bed are very important in providing protection against poisonous gases.

The present invention is concerned with a novel method and apparatus for applying the requisite pressure to a charcoal bed and securing the bed retainer in the canister body.

According to one aspect of the present invention there is provided a method of securing a bed of charcoal under pressure in a plastic material housing comprising:

placing a bed of particulate charcoal in the housing:
placing a retainer over the bed of charcoal;
locating a compactor on the retainer;
engaging a peripheral edge of the housing around the retainer with an ultrasonic welding;
pressing on the compactor; and
activating the welding means to produce an ultrasonic weld at the periphery of the housing securing the retainer therein.

In one embodiment of the method, the welding means is a welding tip that is used to produce a number of discrete welds around the periphery of the housing. In another embodiment, an ultrasonic nodal horn is used to produce a continuous weld. The compactor is engaged with the node point of the horn, so that pressure on the horn exerts pressure on the compactor without transmitting ultrasonic vibrations to the compactor.

Thus, according to an apparatus aspect of the present invention there is provided an apparatus for simultaneously compressing a bed of charcoal in a plastic material housing and welding a retainer into the housing against the charcoal, said apparatus comprising:

an ultrasonic nodal horn with a central node point and a peripheral welding edge engagable with the housing around the retainer for forming an ultrasonic weld securing the retainer in the housing; and
a compactor comprising a base connected to the horn at the node point thereof, a compactor plate for exerting pressure on the retainer and resilient means for biasing the compactor plate away from the base.

Thus, the ultrasonic horn both applies the pressure on the charcoal bed and secures the retainer in the canister body. The ultrasonic energy generated by the horn can very easily pulverize the charcoal granules. Consequently, the horn used is a nodal horn supporting the compactor at the node point of the horn, where it does not vibrate. This prevents the transmission of ultrasonic vibrations to the compactor and thence the charcoal. The compactor spring allows sufficient force to be applied to the charcoal, while the ultrasonic energy is applied to the plastic housing.

In the accompanying drawings, which illustrate an exemplary embodiment of the present invention:

Figure 1:
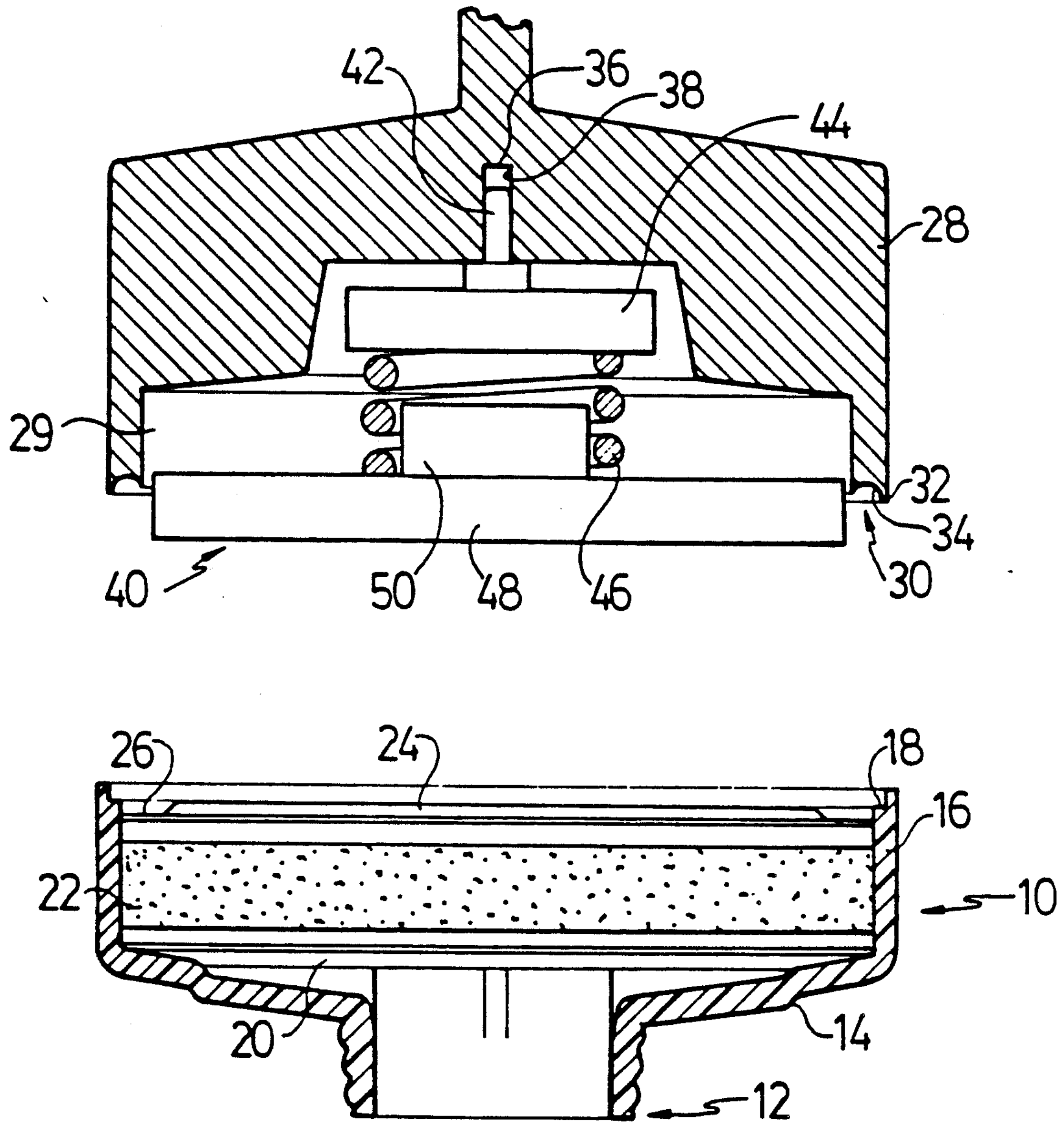
FIG. 1 is a sectional elevation of an apparatus according to the present invention set up ready for use.

Referring to the accompanying drawings, and especially to FIG. 1, a housing 10 of synthetic plastic material with a fitting 12 for connection to the standard fitting of a gas mask. This fitting is located centrally in the end wall 14 of the housing which in turn extends out to a cylindrical side wall 16 with a step 18 at the inside of its peripheral edge. The housing 10 contains a support 20 for a bed 22 of particulate charcoal material. A retainer 24 covers the bed of charcoal. At the periphery of the retainer is a flange 26. To install the retainer permanently in the charcoal bed, an ultrasonic horn 28 is positioned above the housing. The horn has a periphery 30 configured to engage the step 18 on the side wall 16 of housing 10. The horn periphery includes an outer flange 32 surrounding an annular recess 34.

The horn has a cavity 29 in its end, within the peripheral edge 30 to accommodate a compactor. The horn is a nodal horn with a node point 36, where it does not vibrate, at the centre of the cavity. At the node 36, the horn has a bore 38 that is used for supporting the compactor 40 within the cavity 29. The compactor includes a pin 42 that seats in the bore 38 and carries a spring seat 44. The seat engages a coil spring 46 that in turn engages the top of a compactor plate 48 around a central boss 50.

Figure 2:
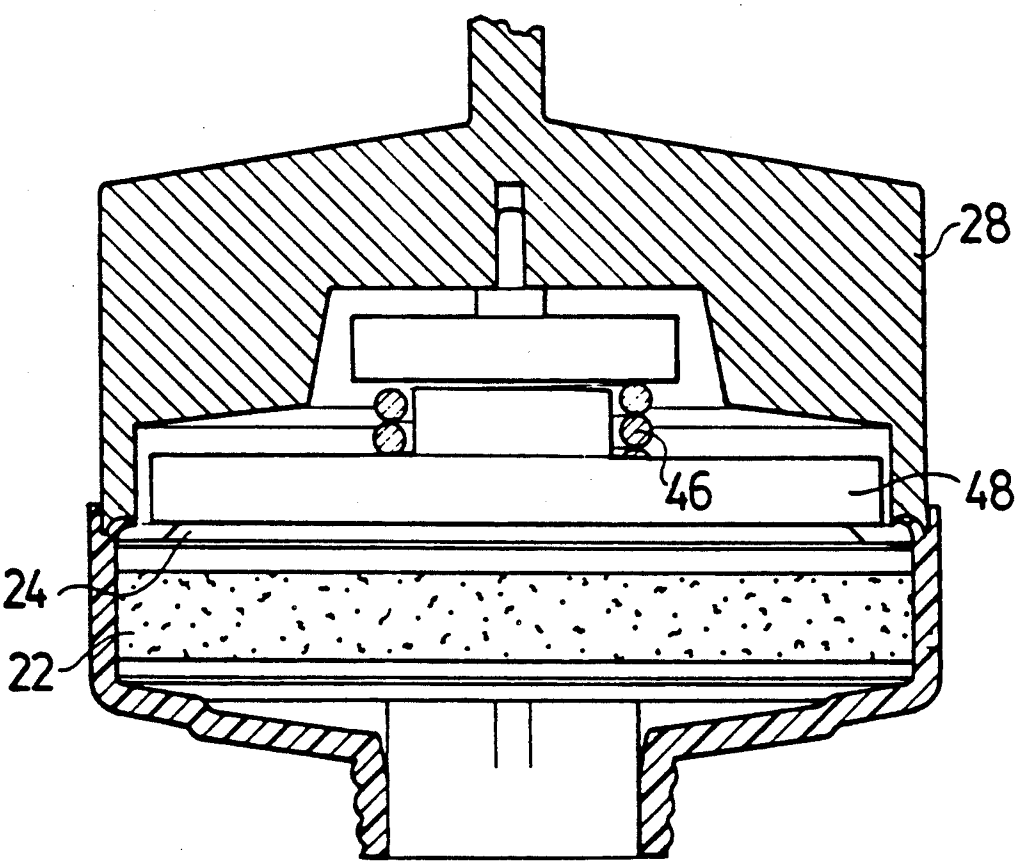
FIG. 2 is a view like FIG. 1 showing the apparatus in use.
Figure 3:
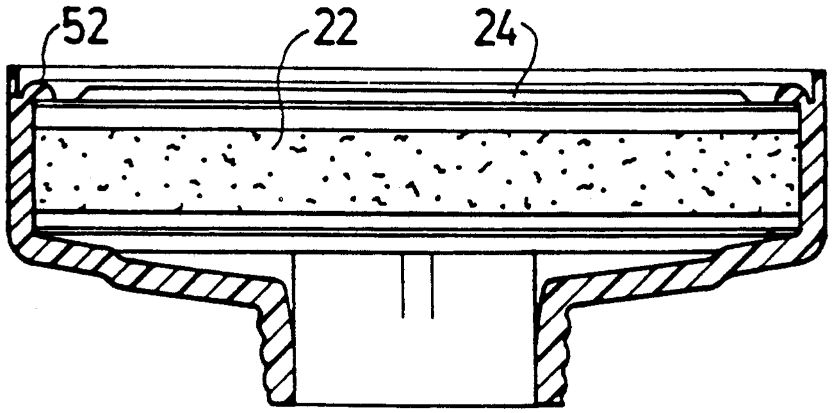
FIG. 3 is a sectional elevation showing the installed charcoal bed.

In use, the horn and compactor combination is lowered onto the housing 10 as illustrated in FIG. 2. The flange 32 and the recess 34 engage the step 18 in the side wall of the housing, while the compactor, under the influence of the compression spring 46, exerts a large force on the retainer 24 to compress the charcoal bed to the required degree. Activating the horn produces ultrasonic vibrations at the periphery 30 and an ultrasonic weld in the material of the housing overlying the flange 26 of the retainer 24, to hold the retainer in the housing, compressing the charcoal bed. The form of the weld is illustrated at 52 in FIG. 3. It will be observed that this matches in form the shape of the periphery of the horn 28.

Figure 4:
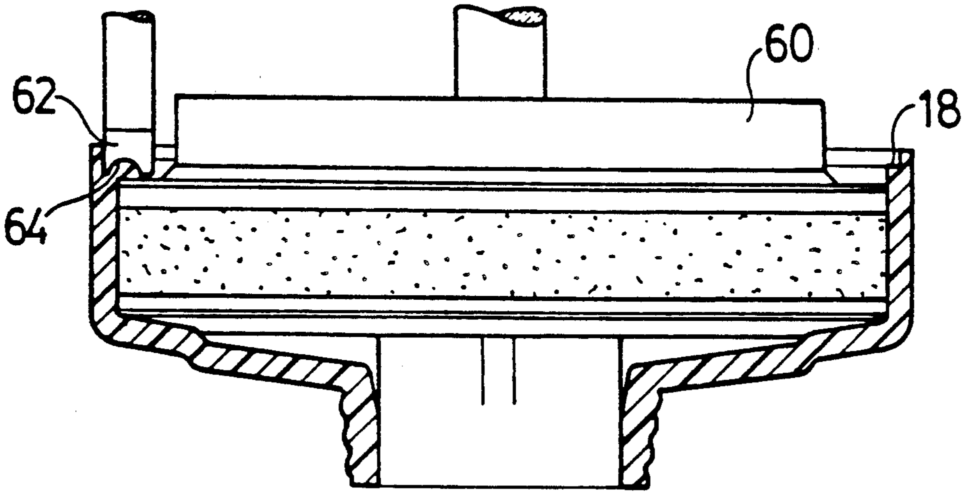
FIG. 4 illustrates an alternative apparatus for producing discrete welds around the housing.

FIG. 4 illustrates an alternative apparatus and method where the compactor 60 is independent of the welding tool. In this case, the ultrasonic welding tool includes a welding tip 62 grooved at 64 to engage the step 18 in the side wall of the housing and to produce a weld at one position securing the retainer in place. One or more tips 62 are used to produce a line of these discrete welds around the housing to fix the retainer in place, while the compactor maintains the desired load on the charcoal bed.

While certain embodiments of the invention have been described in the foregoing, it is to be understood that other embodiments are possible within the scope of the present invention. The invention is to be considered limited solely by the scope of the appended claims.

I claim:

1. A method of securing a bed of charcoal under pressure in a plastic material housing, comprising:

providing a rigid plastic material housing having a cylindrical side wall with a cylindrical outer surface;

placing a bed of particulate charcoal in the housing;

placing a rigid retainer over the bed of charcoal;

locating a compactor on the retainer;

engaging the cylindrical side wall of the housing around the retainer with an ultrasonic welding means at a location spaced inwardly of the cylindrical outer surface;

pressing on the compactor; and activating the welding means to deform an inner portion of the cylindrical side wall so as to extend over the periphery of the retainer to secure the retainer in the housing.

2. A method according to claim 1 wherein the welding means is activated to produce a series of discrete welds in the inner portion of the cylindrical side wall around the periphery of the retainer, while the compactor maintains pressure on the charcoal bed.

3. A method according to claim 2, wherein the welding means engages a step in the inner portion of the cylindrical side wall of the housing to form said series of discrete welds.

4. A method of securing a bed of charcoal under pressure in a rigid plastic material housing comprising:

providing a rigid plastic material housing having a cylindrical side wall with a cylindrical outer surface;

placing a bed of particulate charcoal in the housing;

placing a rigid retainer over the bed of charcoal;

locating a compactor on the retainer;

placing an ultrasonic nodal horn over the compactor, engaging the compactor with a node point of the horn and engaging an inner portion of the cylindrical side wall of the housing around the retainer with a peripheral welding edge of the horn at a location spaced inwardly of the cylindrical outer surface;

pressing on the horn to exert pressure on the compactor; and activating the horn to deform the inner portion of the cylindrical side wall of the housing so as to extend over the periphery of the retainer to form a continuous weld to secure the retainer in the housing.

* * * * *